United States Patent [19]
Mark et al.

[11] Patent Number: 5,549,905
[45] Date of Patent: Aug. 27, 1996

[54] ENTERNAL COMPOSITION FOR PEDIATRIC PATIENTS

[75] Inventors: David A. Mark, Oak Park; Diana Twyman, Chicago; Donna Buckley, Barrington, all of Ill.

[73] Assignee: Clintec Nutrition Co., Deerfield, Ill.

[21] Appl. No.: 324,727

[22] Filed: Oct. 18, 1994

[51] Int. Cl.$^6$ .................................................. A61K 47/00
[52] U.S. Cl. ............................................. 424/439; 514/23
[58] Field of Search ............................... 424/439; 514/23

[56] References Cited

PUBLICATIONS

Ross Products Division, Abbott Laboratories, *Pediasure®Complete Liquid Nutrition*Brochure (1993).
Ross Laboratories, Division of Abbott Laboratories, *Pediasure®, Liquid Nutrition for Children*Brochure (1989).

*Primary Examiner*—Paul J. Killos

[57] ABSTRACT

The present invention provides a method and nutritional composition for providing nutrition to pediatric patients. The methods of the present invention are directed to pediatric patients with impaired nutrient absorption and/or reduced gastrointestinal tolerance. Pursuant to the present invention, the enteral composition includes a hydrolyzed protein source comprising approximately 12% of the total calories, a carbohydrate source and a lipid source comprising a mixture of medium and long chain triglycerides, wherein at least 55% of the lipid source are medium chain triglycerides.

20 Claims, No Drawings

ENTERAL COMPOSITION FOR PEDIATRIC PATIENTS

BACKGROUND OF THE INVENTION

The present invention relates generally to the treatment and nutritional support of patients. More specifically, the present invention relates to providing nutrition to pediatric patients.

The measurement of diet adequacy in patients, especially pediatric patients, is difficult. Increases in a child's weight and length only grossly reflect nutritional progress. The daily requirements for adequate nutrition are especially significant for the growing child compared with the adult. The relative need for protein, vitamins and minerals remains constant and is greater than that of adults. Moreover, requirements for various vitamins depend on the intake of calories, protein, fat, carbohydrate and specific amino acids.

While the nutritional- needs of the pediatric patient differ from adult patients, in health care settings, adult nutritional formulas are the primary form of elemental nutrition currently being used for children. Naturally, adult formulas do no take into effect the known nutritional needs of the pediatric patient. These adult enteral nutritional products must be diluted to decrease concentrations of, for example, protein, sodium, chloride and the renal solute load levels recommended for children. This dilution reduces the concentrations of other needed nutrients that are often already in concentrations too low for children (i.e. calcium and phosphorous). Thus, providing a nutritional formula designed specifically for children would be advantageous.

A whole protein enteral formula sold under the trademark PEDIASURE® is currently available from Ross Laboratories for nutritional therapy of pediatric patients. pEDIASURE® contains 12% protein, 44% carbohydrates, and 44% fat. The whole protein formula has a protein composition of 82% casein and 18% whey.

Although PEDIASURE® is formulated for children, it is designed to provide nutrition for a limited population, namely 1 to 6 years old. As a result thereof, while PEDIASURE® may meet the National Academy of Sciences-National Research Council (NAS-NRC) Recommended Daily Allowances (RDAs) for children 1 to 6 years old in 1000 calories, it requires 1300 calories to meet the RDA of children ages 7 to 10 years.

Moreover, due to the whole protein nature of PEDIASURE® eand other currently used nutritional products, such products do not meet the nutritional needs of certain pediatric patients. Many pediatric patients have health conditions that impair nutrient absorption and/or reduce gastrointestinal tolerance for diets which are based on whole proteins as well as long-chain fatty acids and/or complex carbohydrates. Examples of the diseases and conditions include, but are not limited to, Crohn's disease, cystic fibrosis, short bowel syndrome, cerebral palsy, HIV/AIDS, chronic diarrhea and gastric reflux.

Therefore, a need exists for a nutritional formula designed to meet the nutritional needs of a larger base of pediatric patients as well as pediatric patients with impaired nutrient absorption and/or reduced gastrointestinal tolerance.

SUMMARY OF THE INVENTION

The present invention provides a nutritional composition designed for pediatric patients. Additionally, the present invention provides a method for providing nutrition to a pediatric patient. The present invention also provides a method for providing nutrition to a pediatric patient with impaired nutrient absorption or reduced gastrointestinal tolerance.

In an embodiment, the present invention provides an enteral composition designed for pediatric patients. The enteral composition includes: a hydrolyzed protein source comprising approximately 12% of the total calories; a carbohydrate source; and a lipid source comprising a mixture of medium and long chain triglycerides, wherein at least 55% of the lipid source are medium chain triglycerides.

In an embodiment, the hydrolyzed protein source is hydrolyzed whey.

In an embodiment, the carbohydrate source is either maltodextrin or corn starch. The carbohydrate source comprises approximately 40% to 60% of the total calories of the composition.

In an embodiment, the lipid source comprises approximately 30% to 40% of the total calories of the composition.

In an embodiment, long chain triglycerides of the lipid source are selected from the group consisting of soy, canola, residual milk fat, and soy lecithin.

In an embodiment, the composition further comprises an omega-3 to omega-6 fatty acid ratio of approximately 4:1 to 6:1.

Still further, in an embodiment, the composition includes at least 100% of the NAS-NRC RDA for children of all vitamins and minerals.

The present invention also provides a method for providing nutrition to a pediatric patient. The method comprises the step of administering to the patient a therapeutically effective amount of a composition comprising: a hydrolyzed protein source comprising approximately 10% to 14% of the total calories; a carbohydrate source; and a lipid source comprising a mixture of medium and long chain triglycerides. The lipid source includes an omega-3 to omega-6 fatty acid ratio of approximately 4:1 to 6:1 and medium chain triglycerides comprise at least 50% of the lipid source.

Still further, the present invention provides a method for providing nutrition to a pediatric patient with impaired nutrient tolerance or reduced gastrointestinal tolerance. The method comprises the step of administering to the patient a therapeutically effective amount of an enteral composition comprising: a hydrolyzed protein source; a carbohydrate source; and a lipid source. The hydrolyzed protein source comprises approximately 10% to 14% of the total calories of the composition. The lipid source comprises a mixture of medium and long chain triglycerides. The medium chain triglycerides make up at least 55% of the lipid source. In a preferred embodiment, the MCT content is at least 60% of the lipid source.

An advantage of the present invention is that it provides a nutritional composition that is ready-to-use, nutritionally complete, and contains proteins, lipids, carbohydrates and vitamins and minerals in proportions appropriate for children ages 1–10 years.

Moreover, an advantage of the present invention is that it provides a nutritional diet for tube and oral use designed for optimal tolerance and absorption in children ages 1–10 years.

Another advantage of the present invention is that it provides a composition including a protein source in a percentage that is adequate to support growth and moderate needs for tissue repair without imposing an undue nitrogen burden on renal function.

Furthermore, an advantage of the present invention is that it provides a composition utilizing hydrolyzed whey protein, medium chain triglycerides and maltodextrin to enhance absorption and reduce intolerance.

Yet another advantage of the present invention is that it includes beta-carotene, thereby allowing for the maintenance of plasma beta-carotene concentration in the pediatric patient.

Still another advantage of the present invention is that it possesses an increased amount of sodium than past formulas, resulting in maintainence of plasma sodium concentration within normal range.

Additional features and advantages of the present invention are described in, and will be apparent from, the detailed description of the presently preferred embodiments.

DETAILED DESCRIPTION OF THE PRESENTLY PREFERRED EMBODIMENTS

Nutritional support of hospitalized children requires prevention, recognition, and treatment of the nutritional depletion that may occur with illness. The goals of nutritional support include stabilizing metabolic state, maintaining body mass, and/or facilitating growth in the presence of disease and gastrointestinal dysfunction.

While nutritional deficiency diseases are unusual in our culture today, other disease states exist that alter intake, absorption or metabolism. As set forth above, certain health conditions can impair the nutrient absorption and/or reduce gastrointestinal tolerance for diets which are based on whole proteins, long-chain fatty acids and/or complex carbohydrates.

The inventors believe that the enteral diet of the present invention when administered to pediatric patients suffering from impaired nutrient absorption and/or reduced gastrointestinal tolerance will provide adequate nutritional support to such patients. Specifically, the inventors believe that the use of the composition of the present invention containing specific protein, carbohydrate and fat sources as well as a source of vitamins and minerals provides an effective nutritional support for pediatric patients.

The protein source of the present invention provides approximately 10% to 14% of the total calories of the composition. In an embodiment, the protein source comprises approximately 12% of the total calories of the composition. This protein concentration chosen is adequate to support growth and moderate needs for tissue repair without imposing an undue nitrogen burden on renal function for children ages 1–10 years.

The protein source is a hydrolyzed protein. In an embodiment, the hydrolyzed protein source is hydrolyzed whey. This type of protein source reduces the incidence of gastric reflux because gastric emptying is faster than with diets containing casein or whole whey. Also, hydrolyzed whey protein serves as a rich source of amino acid cysteine. Cysteine is a limiting amino acid for the formation of glutathione, and glutathione needs may be higher in children with infectious or inflammatory conditions. In an embodiment, the composition of the present invention contains approximately 0.27% of calories as cysteine (approximately 690 mg per 1000 calories).

Carbohydrates provide approximately 40% to 60% of the caloric content of the composition. In an embodiment, the carbohydrate source is approximately 55% of the caloric content of the composition. A number of carbohydrates can be used including maltodextrin or hydrolyzed corn starch.

The lipid source includes a mixture of medium chain triglycerides (MCT) and long chain triglycerides (LCT). The lipid source of the present invention is approximately 30% to about 40% of the caloric content of the composition. In an embodiment, the lipid source of is approximately 33% of the caloric content of the composition. The lipid profile is designed to meet essential fatty acid needs (omega-3 and omega-6) while also keeping MCT content high and LCT content low compared with prior formulas.

The lipid source includes at least 50% from medium chain triglycerides. In an embodiment, MCTs make up at least 55% of the lipid source. In a preferred embodiment, the lipid source includes at least 60% from MCTs. The lipid profile is designed to set the MCT content at approximately 60% of lipid content by weight. This limits MCT to under 20% of total calories, thereby reducing the risk of gastrointestinal intolerance. In a preferred embodiment, the medium chain triglyceride source is fractionated coconut oil.

Suitable sources of long chain triglycerides are canola oil, soy oil, residual milk fat, and soy lecithin.

The lipid profile containing such long chain triglycerides is designed to have a polyunsaturated fatty acid omega-6 (n-6) to omega-3 (n-3) ratio of approximately 4:1 to 6:1. In an embodiment, the n-6 to n-3 fatty acid ratio is approximately 5:1. Both the omega-6 and omega-3 fatty acids are provided in sufficient quantity to meet tissue growth maintenance needs. To this end, in an embodiment, the source of omega-6 fatty acids is present in a range of approximately 4–6% of the total calories. The omega-3 fatty acid source is preferably present in the range of approximately 0.8–1.2% of the total calories. In addition to the absorption/tolerance benefits of a relatively low LCT content, the composition of the present invention is less likely to be immunosuppressive due to the low percentage of omega-6 fatty acids.

By way of example, and not limitation, an example of a fatty acid lipid profile that may be used in the composition of the present invention will now be given.

| LIPID | LIPID PROFILE (38.5 g/L) | | |
|---|---|---|---|
| | % of Total Fatty Acids | g/1000 ml | % OF KCAL |
| C6:0 | 0.8 | 0.3 | |
| C8:0 | 29.1 | 11.2 | |
| C10:0 | 20.6 | 7.9 | |
| C12:0 | 1.2 | 0.5 | |
| C14:0 | 0.6 | 0.2 | |
| C16:0 | 3.8 | 1.5 | |
| C18:0 | 1.7 | 0.7 | |
| TOTAL SAT | 57.8 | 22.3 | 21.6% |
| C16:1 | 0.1 | 0.0 | |
| C18:1 | 13.4 | 5.2 | |
| TOTAL MONO | 13.5 | 5.2 | 5.6% |
| C18:2 n6 | 12.2 | 4.7 | 4.9% |
| C18:3 n3 | 2.4 | 0.9 | 0.9% |
| TOTAL POLY | 14.6 | 5.6 | 5.8% |
| TOTAL | 86.0 | 33.1 | 33.0% |

Still further, the present invention, in an embodiment, includes a specialized vitamin and mineral profile. The composition includes a source of vitamins and minerals providing at least 100% of the NAS-NRC Recommended Daily Allowance for children. The vitamin and mineral requirements are met in 1000 kcal per day because this intake is practical, achievable and easily tolerated by children ages 1–10 years, even though it is somewhat less than healthy children normally eat. Unlike prior compositions, the composition of the present invention meets NAS-NRC RDAs for children ages 1–10 years in 1000 calories. The high vitamin and mineral concentration of the present invention is of practical benefit because typical feeding regimens (e.g. 50mL/hour for 20 hours/day) will meet all needs. However, none of the vitamin or mineral concentrations are so high that there is any risk of approaching toxic levels, even at 2000–2500 kcal per day.

In an embodiment, the composition of the present invention includes a source of beta-carotene. The inventors view beta-carotene, formerly considered only as a precursor to vitamin A, as an important nutrient with anti-oxidant properties. In an embodiment, the composition includes approximately 0.5–2.0 mg of betacarotene per 1000 calories. This amount of beta-carotene is sufficient to maintain plasma beta-carotene concentration in the pediatric patient.

The composition of the present invention, in an embodiment, includes certain electrolyte concentrations. The electrolyte concentrations are set to meet needs without providing an undue renal solute burden on kidney function. To this end, sodium is preferably present in a range of approximately 420–500 mg/L. In an embodiment, potassium and chloride are present at ranges of approximately 2060–380 mg/L and 1040–1120 mg/L, respectively. The renal solute load is, in an embodiment, present in a range of approximately 200–210 mOsm. In a preferred embodiment, the electrolyte concentrations of the present invention are as follows: sodium is present at 460 mg/L; potassium is present at 320 mg/L; chloride is present at 1080 mg/L; and the renal solute load is at 205 mOsm.

The composition of the present invention is a ready-to-use enteral formulation. The composition can be used as a supplement or for total enteral nutritional support. The composition can be tube-fed to a patient, or fed by having the patient drink same. Preferably, the caloric density of the composition is 1.0 kcal/ml.

The composition of the present invention can be used for providing nutrition to a pediatric patient ages 1 to 10 years. Likewise, the composition can be used for providing nutrition to a pediatric patient with impaired nutrient absorption and/or reduced gastrointestinal tolerance. The diet utilizes hydrolyzed whey protein, medium chain triglycerides and maltodextrin to enhance absorption and reduce intolerance.

By way of example, and not limitation, an example of a suitable composition that may be used pursuant to the present invention is as follows:

The composition includes the following ingredients: protein: whey; carbohydrate: maltodextrin, sucrose, corn starch; lipid: safflower oil, canola oil, soy oil, coconut oil (MCT), residual milk fat, soy lecithin; water; vitamin A (retinol); beta-carotene; vitamin D, vitamin E; vitamin K; vitamin C; thiamine $B_1$; riboflavin $B_2$; niacin; vitamin $B_6$; folic acid; pantoth acid; vitamin $B_{12}$; biotin; choline; taurine; L-carnitine; inositol; calcium; phosphorus; magnesium; zinc; iron; copper; manganese; iodine; sodium; potassium; chloride; chromium; molybdenum; and selenium.

The composition of the present invention has the following nutrient composition (per 1000 calories):

| NUTRIENT COMPOSITION | AMOUNTfl |
|---|---|
| CAL. DENSITY | 1.0 (kcal/ml) |
| PROTEIN | 30.0(12%) g(%) |
| WHEY | 100% |
| CARBOHYDRATE | 137.5(55%) g(%) |
| LIPID | 38.5(33%) g(%) |
| SAFFLOWER OIL | — |
| CANOLA OIL | 13% |
| SOY OIL | 16% |
| COCONUT OIL MCT | 60% |
| RESIDUAL MILK FAT | 6% |
| SOY LECITHIN | 5% |
| N6:N3 RATIO | 5:1 |
| WATER | 850 ml |
| VITAMIN A (RETINOL) | 2400 IU |
| BETA-CAROTENE | 1.0 mg |
| VITAMIN D | 560 IU |
| VITAMIN E | 28 IU |
| VITAMIN K | 30 mcg |
| VITAMIN C | 100 mg |
| THIAMINE $B_1$ | 2.4 mg |
| RIBOFLAVIN $B_2$ | 2.0 mg |
| NIACIN | 20 mg |
| VITAMIN $B_6$ | 2.4 mg |
| FOLIC ACID | 400 mcg |
| PANTOTH. ACID | 10 mg |
| VITAMIN $B_{12}$ | 6 mcg |
| BIOTIN | 300 mcg |
| CHOLINE | 300 mg |
| TAURINE | 80 mg |
| L-CARNITINE | 40 mg |
| INOSITOL | 80 mg |
| CALCIUM | 1000 mg |
| PHOSPHORUS | 800 mg |
| Ca:P | 1.25:1 weight |
| MAGNESIUM | 200 mg |
| ZINC | 15 mg |
| IRON | 14 mg |
| COPPER | 1.0 mg |
| MANGANESE | 1.5 mg |
| IODINE | 120 mcg |
| SODIUM | 460 mg |
| POTASSIUM | 1320 mg |
| CHLORIDE | 1080 mg |
| Na:K | 0.59:1 molar |
| (Na + K)/Cl | 1.71 molar |
| CHROMIUM | 30 mcg |
| MOLYBDENUM | 30 mcg |
| SELENIUM | 30 mcg |

It will be understood that various modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An enteral composition designed for pediatric patients comprising:

a hydrolyzed protein source comprising approximately 12% of the total calories;

a carbohydrate source; and a lipid source comprising a mixture of medium and long chain triglycerides, wherein at least 55% of the lipid source are medium chain triglycerides.

2. The composition of claim 1 wherein the hydrolyzed protein source is hydrolyzed whey.

3. The composition of claim 1 further comprising a source of beta-carotene.

4. The composition of claim 1 wherein the carbohydrate source is selected from the group consisting of: maltodextrin and corn starch.

5. The composition of claim 1 wherein the long chain triglycerides are selected from the group consisting of soy, canola, residual milk fat, and soy lecithin.

6. The composition of claim 1 further comprising an omega-6 to omega-3 fatty acid ratio of approximately 4:1 to 6:1.

7. The composition of claim 1 further comprising at least 100% of the NAS-NRC RDA of all vitamins and minerals in approximately 1000 calories.

8. The composition of claim 1 further comprising omega-6 fatty acids present in an amount of approximately 4 to 6% of the total calories.

9. A method for providing nutrition to a pediatric patient comprising the step of administering to the patient a therapeutically effective amount of a composition comprising:

a hydrolyzed protein source comprising approximately 10% to 14% of the total calories;

a carbohydrate source; and a lipid source comprising a mixture of medium and long chain triglycerides, wherein at least 50% of the lipid source are medium chain triglycerides and the lipid source includes an omega-6 to omega-3 fatty acid ratio of approximately 4:1 to 6:1.

10. The method of claim 9 wherein the hydrolyzed protein source is hydrolyzed whey.

11. The method of claim 9 wherein the lipid source comprises approximately 33% of the total calories.

12. The method of claim 9 further comprising a source of beta-carotene.

13. The method of claim 9 further comprising at least 100% of the NAS-NRC RDA of all vitamins and minerals in approximately 1000 calories.

14. The method of claim 9 further comprising omega-6 fatty acids present in an amount of approximately 4 to 6% of the total calories.

15. A method for providing nutrition to a pediatric patient with impaired nutrient absorption or reduced gastrointestinal tolerance comprising the step of administering to the patient a therapeutically effective amount of a composition comprising:

a hydrolyzed protein source comprising approximately 12% of the total calories;

a carbohydrate source; and a lipid source comprising a mixture of medium and long chain triglycerides, wherein at least 55% of the lipid source are medium chain triglycerides.

16. The method of claim 15 wherein the hydrolyzed protein source is hydrolyzed whey.

17. The method of claim 15 further comprising an omega-6 to omega-3 fatty acid ratio of approximately 4:1 to 6:1.

18. The method of claim 15 further comprising a source of beta-carotene.

19. The method of claim 15 further comprising at least 100% of the NAS-NRC RDA of all vitamins and minerals in approximately 1000 calories.

20. The method of claim 15 further comprising omega-6 fatty acids present in an amount of approximately 4 to 6% of the total calories.

* * * * *